United States Patent
MacDougall

(10) Patent No.: US 7,129,470 B2
(45) Date of Patent: Oct. 31, 2006

(54) OPTICAL SENSOR USING A LONG PERIOD GRATING SUITABLE FOR DYNAMIC INTERROGATION

(75) Inventor: Trevor MacDougall, Simsbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 385 days.

(21) Appl. No.: 10/454,101

(22) Filed: Jun. 4, 2003

(65) Prior Publication Data
US 2004/0245444 A1 Dec. 9, 2004

(51) Int. Cl.
*G02B 6/00* (2006.01)

(52) U.S. Cl. .............................. 250/227.14; 250/231.1; 385/12

(58) Field of Classification Search ............................... 250/227.14–227.19, 227.21, 227.23, 231.1; 385/12, 13, 37
See application file for complete search history.

(56) References Cited

U.S. PATENT DOCUMENTS

| | | | |
|---|---|---|---|
| 5,945,666 A | 8/1999 | Kersey et al. | |
| 6,422,084 B1 | 7/2002 | Fernald et al. | 73/705 |
| 6,439,055 B1 | 8/2002 | Maron et al. | 73/705 |
| 6,785,004 B1 * | 8/2004 | Kersey et al. | 356/478 |
| 6,931,188 B1 * | 8/2005 | Kersey et al. | 385/125 |
| 6,955,085 B1 * | 10/2005 | Jones et al. | 73/514.26 |

FOREIGN PATENT DOCUMENTS

| | | |
|---|---|---|
| GB | 2 348 000 | 9/2000 |
| GB | 2 402 740 | 6/2004 |

OTHER PUBLICATIONS

U.K. Search Report, Application No. GB0411875.8, dated Sep. 23, 2004.
U.S. Appl. No. 09/726,059, filed Nov. 29, 2000, Kersey et al.
U.S. Appl. No. 10/371,910, filed Feb. 21, 2003, Kersey et al.
GB Examination Report, Application No. GB0411875.8, dated Oct. 25, 2006.

* cited by examiner

*Primary Examiner*—Stephone B. Allen
(74) *Attorney, Agent, or Firm*—Patterson & Sheridan, LLP

(57) ABSTRACT

Disclosed herein is an optical sensor design and method for continually interrogating that sensor to produce an accurate representation of a dynamic event (such as a change in strain, pressure or temperature) being monitored by the sensor. The sensor design preferably constitutes continuous wave optical source/detection equipment coupled in series to a first fiber Bragg grating (FBG), a long period grating (LPG), and a second FBG formed in an optical waveguide. The LPG broadly attenuates light in the vicinity of the Bragg reflection wavelength $\lambda_{2B}$ of the second FBG, and this attenuation profile shifts in wavelength in accordance with the dynamic event being monitored. Perturbation of the attenuation profile thus attenuates the intensity of the light reflected from the second FBG, i.e., $I(\lambda_{B2})$, because such reflected light must pass (twice) through the LPG. Accordingly, continually monitoring $I(\lambda_{B2})$ as a function of time allows the dynamic event to be recreated and processed accordingly. If necessary, $I(\lambda_{B2})$ can be normalized by dividing it by the intensity of the Bragg reflection wavelength from the first FBG, $I(\lambda_{B1})$, to discard attenuation within the system not related to the dynamic event being monitored.

74 Claims, 2 Drawing Sheets

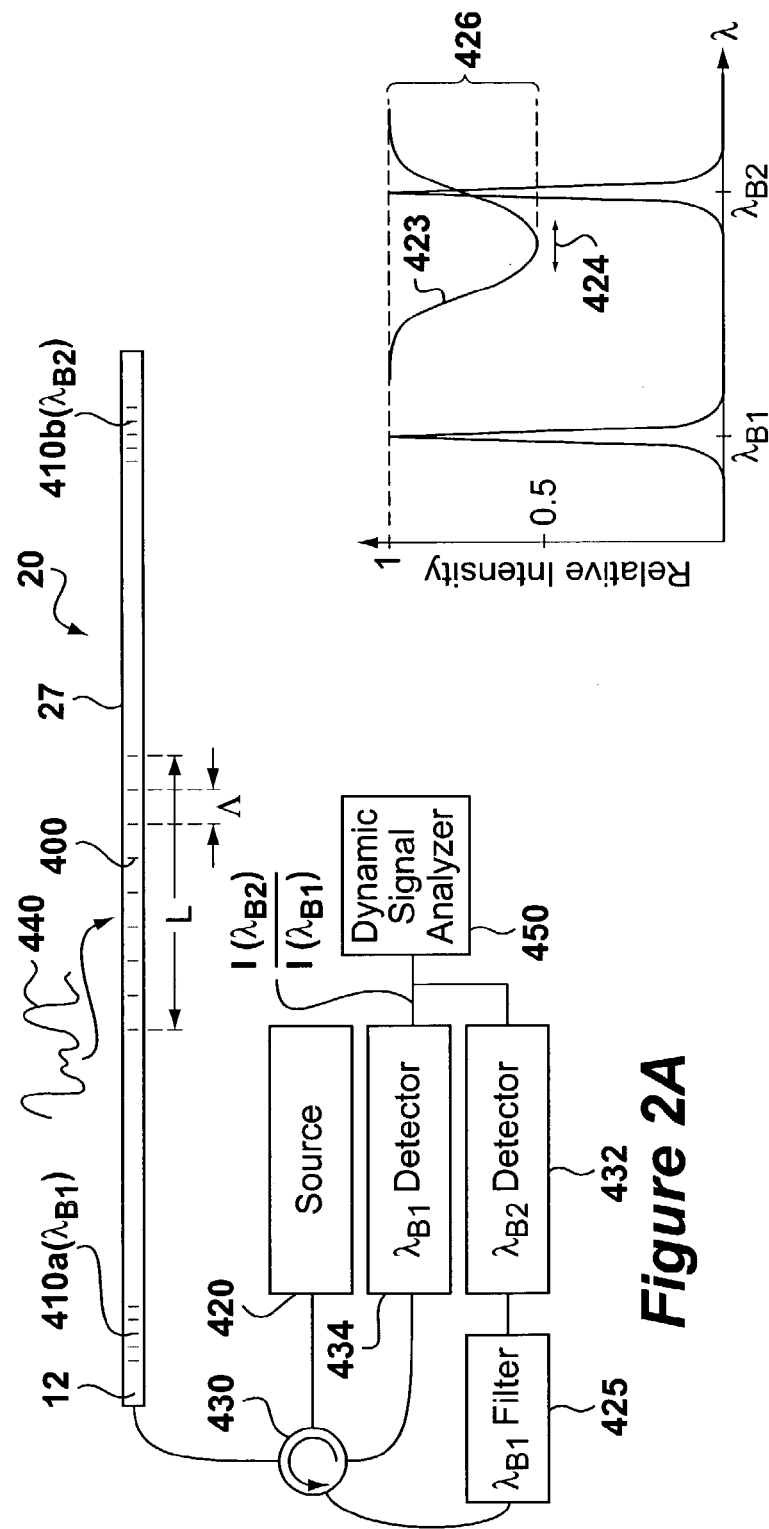
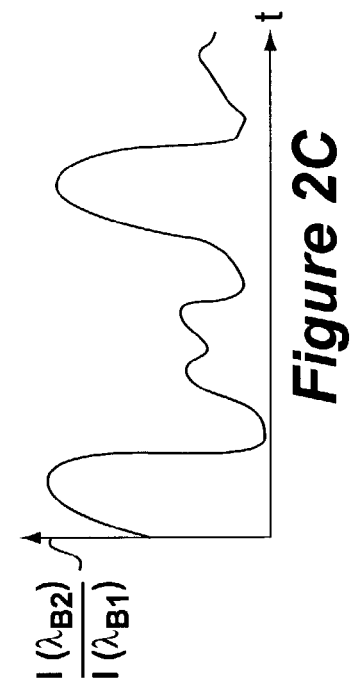
*Figure 2A*
*Figure 2B*
*Figure 2C*

OPTICAL SENSOR USING A LONG PERIOD GRATING SUITABLE FOR DYNAMIC INTERROGATION

CROSS REFERENCES TO RELATED APPLICATIONS

U.S. patent application Ser. No. 10/452,124 filed Jun. 2, 2003, now U.S. Pat. No. 6,955,085, entitled "Optical Accelerometer or Displacement Device Using A Flexure System," filed concurrently herewith, contains subject matter related to that disclosed herein, and is incorporated herein by reference in its entirety.

TECHNICAL FIELD

This invention relates to an optical sensor, and more specifically to an optical sensor for monitoring dynamic events and associated interrogation methods.

BACKGROUND ART

Optical sensors are well known in the art, and have utility in a number of different measurement applications. For example, and as shown in FIG. 1, a fiber Bragg grating 10 (FBG 10) formed in an optical fiber 12 or other optical waveguide can be used to measure pressure or temperature. A FBG, as is known, is a periodic or aperiodic variation in the effective refractive index of a core of an optical waveguide, similar to that described in U.S. Pat. Nos. 4,725,110 and 4,807,950 entitled "Method For Impressing Gratings Within Fiber Optics," to Glenn et al. and U.S. Pat. No. 5,388,173, entitled "Method And Apparatus For Forming Aperiodic Gratings In Optical Fibers," to Glenn, which are incorporated by reference in their entireties.

FBG 10, when interrogated by broadband light from an optical source/detector 14, will reflect a narrow band of this light (essentially a single wavelength), called the Bragg reflection wavelength, $\lambda_B$, in accordance with the equation $\lambda_B \propto 2n_{eff}\Lambda$, where $n_{eff}$ denotes the index of refraction of the core of the waveguide, and $\Lambda$ denotes the spacing of the variations in the refractive index of the core (i.e., the grating spacing). Because strain along the axis of an FBG affects its grating spacing $\Lambda$, and because temperature effects both the index of refraction $n_{eff}$ and the grating spacing $\Lambda$ (in the latter case, due to thermal expansion or contraction), FBG 10 can be used as either as pressure or temperature sensor by assessing the magnitude of the shift in its Bragg reflection wavelength. FBG 10 is usually partially transmissive so that a portion of the light at the Bragg reflection wavelength (and light of all other wavelengths that is not affected by the FBG 10) transmits through the FBG 10, which allows further sensors along the optical fiber 12 (not shown) to be interrogated in a multiplexing approach to determine the pressures and/or temperatures present in those locations.

When interrogating the FBG 10, the optical source/detector 14 can be operated in a continuous wave mode, where light is continuously fed to the FBG 10 and its reflections are continuously monitored, or the light can be pulsed. In a pulsed scheme, the frequency of the pulses needs to be sufficiently short to detect changes in the parameter being measured. For example, when measuring temperature in a given application, such as within an oil/gas well, it is noted that temperature does not change very rapidly, or at least it is usually not of interest to the well operator to detect such rapid changes if they occur. Accordingly, light pulses need to be sent from the optical source/detector 14 only occasionally, for example, every second, which provides an update of the temperature at the location of FBG 10 every second.

However, some parameters of interest to detect occur on much smaller time scale. For example, if the FBG 10 is used to measure a dynamic event, such as a pressure wave indicative of seismic activity occurring within the oil/gas well, sampling needs to take place more frequently. For example, a seismic pressure wave may contain frequency components as high as f=1000 Hz, and therefore would require interrogating the FBG 10 one the order of at least 2f times a second to properly resolve these higher order frequency components and to provide an accurate picture of the detected pressure wave. However, such high frequency rate pulsed sampling may not be possible in a practical application. For example, the FBG 10 will likely in an oil/gas application be wavelength-division or time-division multiplexed to other optical sensors such as flow rate meters, speed of sound meters, or other pressure or temperature sensors, and such meters or sensors may themselves contain FBGs which will produce reflections. (Examples of such other meters or sensors, and ways of multiplexing and interrogating them, are disclosed in the following U.S. patents or patent application, which are hereby incorporated by reference in their entireties: Ser. No. 09/740,760, filed Nov. 29, 2000; Ser. No. 09/726,059, filed Nov. 29, 2000; Ser. No. 10/115,727, filed Apr. 3, 2002; U.S. Pat. No. 6,354,147, issued Mar. 12, 2002). High rate sampling of FBG 10 could interfere with interrogation of the other optical sensors or meters multiplexed with FBG 10, and/or confused the reflected signals, making it difficult to determine which reflections pertain to which meter or sensor.

As alluded to above, one solution to the problem of interrogating the FBG 10 to monitor dynamic events is to interrogate the FBG 10 with a continuous wave light source. Continuous wave interrogation produces a continuous reflection of Bragg wavelengths shifts from the FBG 10, which can be monitored as a function of time. However, continually monitoring Bragg wavelength shifts is difficult in many applications, and requires detectors and signal processing schemes that are not always economical in practice.

Accordingly, there is room for improvement in the art of optical sensors. The art would benefit from a sensor design which can monitor dynamic events in real time, and which is interrogatable using methods that are easily implemented and reliable.

SUMMARY OF THE INVENTION

Disclosed herein is an optical sensor design and method for continually interrogating that sensor to produce an accurate representation of a dynamic event (such as a change in strain, pressure or temperature) being monitored by the sensor. The sensor design preferably constitutes continuous wave optical source/detection equipment coupled in series to a first fiber Bragg grating (FBG), a long period grating (LPG), and a second FBG formed in an optical waveguide. The LPG broadly attenuates light in the vicinity of the Bragg reflection wavelength $\lambda_{2B}$ of the second FBG, and this attenuation profile shifts in wavelength in accordance with the dynamic event being monitored. Perturbation of the attenuation profile thus attenuates the intensity of the light reflected from the second FBG, i.e., $I(\lambda_{B2})$, because such reflected light must pass (twice) through the LPG. Accordingly, continually monitoring $I(\lambda_{B2})$ as a function of time allows the dynamic event to be recreated and processed accordingly. If necessary, $I(\lambda_{B2})$ can be normalized by dividing it by the intensity of the Bragg reflection wavelength from the first FBG, $I(\lambda_{B1})$, to discard attenuation within the system not related to the dynamic event being monitored.

BRIEF DESCRIPTION OF THE DRAWINGS

FIG. 2A illustrates the disclosed interrogation system and sensor design which incorporates the use of a long period grating (LPG), and illustrates a dynamic event to be monitored by the system.

FIG. 2B illustrates the reflection profiles of the FBGs which bind the LPG, and also shows the effect of attenuation through the LPG on the reflection profile from the second FBG.

FIG. 2C illustrates the detector output which constitutes a recreation of the dynamic event being monitored, as normalized to subtract out system parasitic attenuation.

DETAILED DESCRIPTION OF THE PREFERRED EMBODIMENTS

Figure 1:
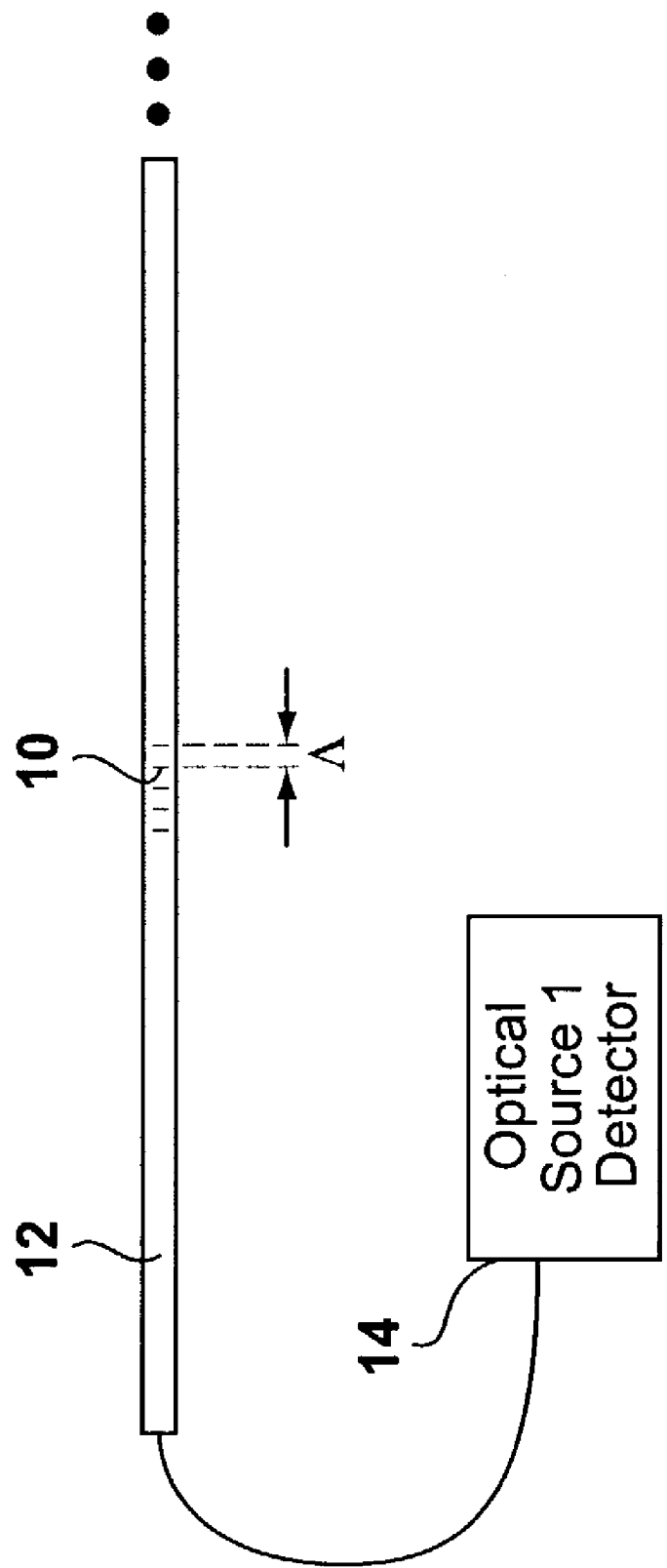
FIG. 1 illustrates a prior art system for monitoring a parameter using an FBG.

In FIG. 2A, the parameter-measuring FBG 10 of FIG. 1 has been replaced by a long period grating (LPG) 400 along the optical waveguide 12. The dynamic event 440 being sensed effects the LPG 400, which acts as the sensitive element as will be explained below. While capable of detecting different types of dynamic events 440, such as temperature variations, this disclosure assumes for simplicity that the dynamic event 440 constitutes a dynamic pressure, such as a seismic pressure wave, which is the application for which the improved sensor and interrogation technique was primarily designed. The spacing $\Lambda$ of the index of refraction modulation in an LPG 400 is greater than normally used in a narrow band Bragg reflector, ranging on an order of over 25 microns, e.g., about 100 microns, and stretching over a length L of approximately 2 cm. The LPG 400 provides coupling of light propagating in the waveguide to forward propagating cladding modes which are eventually lost due to absorption and scattering. The LPG 400 can be customized to couple light of specific wavelength bands into the cladding.

The LPG 400 is bounded by shorter reflective FBGs 410a and 410b having Bragg reflection wavelengths $\lambda_{B1}$ and $\lambda_{B2}$ of, for example, 1530 nm and 1550 nm respectively, and having grating spacings $\Lambda$ of 0.51 and 0.52 microns respectively. Because these FBGs 410a, 410b are preferably not used in this embodiment as the pressure-sensitive elements, but rather are used merely to bind the pressure-sensitive LPG 400, FBGs 410a, 410b are preferably isolated from the pressures being sensed. Moreover, they can be remotely located from LPG 400, perhaps even by kilometers. Therefore, the FBGs 410a, 410b can be removed from the environment in which pressure sensing is taking place. For example, the FBGs 410a, 410b can be located near the optical source/detection equipment residing at the surface of an oil/gas well (not shown), while the LPG 400 is deployed in the well to take pressure measurements. Alternatively, the FBGs 410a, 410b can be deployed in the environment to be monitored, e.g., in the well, but isolated from the pressures or temperatures in that environment that might cause their Bragg reflection wavelengths to significantly shift. For example, the FBGs 410a, 410b could be sealed in appropriate pressure vessels, or covered with high pressure sheaths to prevent their deformation. In any event, it is not strictly necessary to isolate the FBGs 410a, 410b from the pressures being measured, and they can in some applications also be subject to the pressures being measured as will be explained below. While FIG. 2A shows the LPG 400 and the FBGs 410a, 410b as being formed along a common optical waveguide 12, this is not strictly necessary, and instead these components could be coupled or spliced together. For simplicity, a grating is said to be "formed in" an optical waveguide even if it is spliced or coupled to a waveguide, and two gratings are said to be "formed in" a single optical waveguide even if they are located on two waveguides which are coupled or spliced together.

In a preferred embodiment, continuous wave broadband light from light source 420 enters an optical circulator 430, which directs the light to the LPG 400 and FBGs 410a, 410b. As shown in FIG. 2B, the LPG 400 imparts an insertion loss 423 to a relatively broad spectrum of light that passes through it, and this insertion loss profile 423 preferably overlaps the Bragg reflection wavelength $\lambda_{B2}$ of the second FBG 410b, more preferably near the middle of one of the broadly sloped edges of the profile 423 as shown. The dynamic pressure 440 being detected changes the spacing of the index of refraction modulation for the LPG 400, which causes every point in the transmitted spectral profile 423 to shift in wavelength, as shown at 424. It is preferably to understand the exact shape of the insertion loss 423, and how it responds to pressure (424) prior to its inclusion in the system, which can be determined by testing and/or computerized modeling.

While light reflected from the first FBG 410a at $\lambda_{B1}$ is not attenuated by the LPG 400, light reflected from the second grating 410b at $\lambda_{B2}$ will be attenuated in its intensity over region 426. (One skilled in the art will recognize that light at wavelength $\lambda_{B2}$ is attenuated twice, because the incident light must pass to and from the second FBG 410b, and thus will pass through the long period grating twice; this multiplicative effect on the attenuation in the reflected intensity from FBG 410b is not shown in FIG. 2B for simplicity). Because the dynamics of the insertion loss profile 423 and its response to pressure (424) are known, the attenuation or change of the intensity of light reflected from the second FBG 410b, i.e., $I(\lambda_{B2})$ can be correlated to the pressure presented to the LPG 400 at any given point in time.

This reflected light from the FBGs 410a, 410b then proceeds by way of circulator 430 to high frequency detectors 432 and 434. Detector 432 detects light tuned to the Bragg reflection wavelength of the second FBG, $\lambda_{B2}$. Light tuned to $\lambda_{B1}$, by contrast, is reflected by filter 425 and directed by circulator 430 to detector 434 where it is assessed. By comparing the intensity of this reflected signal $I(\lambda_{B2})$ at detector 432 with the intensity of the signal reflected from the first Bragg grating $I(\lambda_{B1})$ at detector 434, the dynamic strain 440 imparted to the optical element 20 can be recreated in real time as shown in FIG. 2C. Thereafter, the resulting signal can be assessed pursuant to well known signal analysis techniques; for example, the signal's frequency components can be assessed using a dynamic signal analyzer 450, which is well known.

In this scheme, $I(.lambda..sub.B1)$ is used to normalize $I(.lambda..sub.B2)$, i.e., to remove attenuation losses in the system that are not due to dynamic pressure 440 impingent upon the LPG 400. However, this is not strictly necessary, and accordingly FBG 410a can be dispensed with, with the variation in $I(.lambda..sub.B2)$ alone used to characterize the detected dynamic pressure. Dispensing with normalization in this fashion is particularly useful if the attenuation losses in the system are well known or characterized, or if the magnitude of the detected dynamic pressure 440 is not interesting to know with particularity. For example, in a seismology application, it may be desirable to know only the shape of the incident pressure wave, and hence its frequency components, rather than the magnitude of these components.

As noted earlier, this technique is beneficial in that it can operate with a continuous wave light source instead of by high rate pulsed sampling (although sampling can also be used), which allows detection of higher frequency components present in the dynamic strain 440. The detectors 432 and 434 are accordingly preferably high frequency detectors capable of resolving the higher frequency components of interest in the dynamic pressure 440. Either a broadband light source 420, or at least a source containing frequency components tuned to the two FBGs 410*a*, 410*b*, is suitable. One skilled in the art should note that separate detectors 432 and 434 need not be used, and that a single detector capable of sensing both FBG reflections can be used instead. Moreover, the detectors 432, 434, source 420, circulator 430, and signal analyzer 450 can be coupled together, e.g., in a common optical source/detection unit (as in 14 of FIG. 1), although they are shown separately in FIG. 2A to more easily understand their individual functions.

As noted earlier, the FBGs 410*a*, 410*b* are preferably isolated from the parameter (in this case, dynamic pressure 440) being sensed, although this is not strictly necessary. Should FBGs 410*a*, 410*b* be subject to dynamic pressure 440, or other stresses in the environment being measured, such as temperature and pressure, the Bragg reflection wavelengths .lambda..sub.B1 and .lambda..sub.B2 will shift, but this is not deleterious and can be compensated for at the detectors 432, 434, and filter 425. For example, if it is known that the Bragg reflection wavelengths for each of the FBGs 410*a*, 410*b* can be expected to vary +/−5 nm in a given operational environment, the detectors 432, 434, and filter 425 can be tuned accordingly to ensure that the detected (or filtered) signals correspond to FBGs 410*a*, 410*b*. For example, the .lambda..sub.B2 detector 432 can be designed to detect the intensity of reflections occur within a band from 1545 nm to 1555 nm. If the expected variation in the Bragg wavelength shift of these FBGs is potentially greater, their Bragg reflection wavelengths can be set a further distance apart (e.g., 1520 nm and 1560 nm) to ensure no overlap in detection of the bands of interest. In environments in which the FBGs are subject to stresses, it is particularly preferred to use normalizing FBG 410*a* to assist in subtraction of intensity-varying effects that are due to that environment, as opposed to the event in that environment being monitored.

The above-disclosed approach provides a simple way to recreate the detected dynamic pressure without the need for high rate pulsed sampling, and without the inconvenience of continuous wave spectral monitoring approaches used in the prior art. For example, and as discussed above, were a continuous wave source to interrogate the pressure-sensitive FBG 10 in FIG. 1, the optical source/detector 14 would need to determine the Bragg wavelength shift and track that shift as a function of time, a relatively demanding task. By contrast, using the disclosed sensor design incorporating the long period grating, the detector(s) need only measure intensity at one (or two) wavelengths (or at relatively narrow bands around those wavelengths). Intensity is easily determined by simply monitoring the detector current at those tuned wavelengths, and thus can be performed without the need to spectrally process the reflected signal.

Although FBGs 410*a*, 410*b* are preferred, it is not strictly necessary to use FBGs to bind the LPG 400. Any device, such as a tuned reflector, capable of reflecting light at a given wavelength (i.e., $\lambda_{B1}$ and $\lambda_{B2}$) or in discrete bands can be used in lieu of these components.

The disclosed sensor structure and method for interrogating the reflections therefrom can benefit and improve a wide variety of optical sensors, and particularly those that are used to measure dynamic events. An example of a sensor benefited by the disclosed approach is disclosed in U.S. patent application Ser. No. 10/452,124, entitled "Optical Accelerometer or Displacement Device Using A Flexure System," which is concurrently filed herewith and which is incorporated herein by reference in its entirety. Other examples of sensors in which the disclosed technique can be employed include static strain or temperature sensors, electrical current sensors, chemical analysis sensors, vibration sensors, liquid level sensors, etc. The LPG can also be made sensitive to the external index of refraction which will allow its use for chemical and presence of liquids.

As disclosed in the above-referenced application U.S. patent application Ser. No. 10/452,124, the LPG 400 can be placed in the narrowed portion of a relatively large diameter "cane" waveguide, with the FBGs 410*a*, 410*b*, being placed at larger diameter portions of the cane waveguide, in a so-called "dog bone" structure. Alternatively, the LPG 400 (and or the FBGs 410*a*, 410*b*) can all be placed in a large diameter cane based waveguide, without utilizing a narrowed portion. Further information concerning cane based waveguides can be found in U.S. patent application Ser. No. 10/371,910, filed Feb. 21, 2003, which is incorporated herein by reference.

If desirable, further loss can be imparted to the waveguide over and beyond that provided by the LPG 400. For example, the LPG could be replaced by notches in the waveguide, or air gaps, which would generally act to broadly attenuate light passing therethrough. Other techniques for purposefully imparting loss to the LPG, or to optical waveguide more generally, could also be used.

As used herein, "fiber Bragg grating" or "FBG" do not necessary imply that the grating is contained within a fiber, i.e., a standard communications optical fiber. Any suitable grating for simplicity, and consistent with common nomenclature, is referred to herein as an "fiber Bragg grating" or "FBG" even if it is contained within larger diameter waveguides (e.g., cane-based waveguides) or other optical waveguides which are not optical fibers, such as those disclosed herein and preferably used in connection with the optical sensing element 20.

"Long period grating" of "LPG" should not be understood to encompass gratings having traditional grating spacings A for reflecting light near the visible portion of the electromagnetic spectrum, e.g., from 400 to 800 nm. Instead, a "long period grating" or "LPG" should be understood as having grating spacings approximately at least 100 times larger than such typical grating spacing values.

"Coupled" as used in this disclosure should not necessarily be interpreted to require direct contact. Thus, two elements can be said to be "coupled" from a functional standpoint even if an intermediary element intervenes between them.

"Light" as used herein does not necessarily constitute visible light, but instead for simplicity constitutes any portion of the electromagnetic spectrum useable to interrogate the disclosed sensors.

Although the disclosed sensors are described as being interrogated by assessing reflection therefrom, those of skill in the art will recognize that assessing transmission of light through the sensors is equally feasible.

Although designed as particularly useful for measuring seismic activity in oil/gas well applications, the disclosed sensor and techniques can be used to sense dynamic and constant forces in any number of applications, including other industrial sensing applications.

What is claimed is:

1. A sensor for sensing a parameter in an environment, comprising:
   a long period grating formed in an optical waveguide, wherein a second end of the long period grating is coupleable to an optical source and an optical detector; and
   a first reflector coupled to a first end of the long period grating for reflecting a first light through the long period grating to the second end, wherein the long period grating imparts an insertion loss to the intensity of the first reflected light, and wherein the insertion loss is indicative of the sensed parameter, and wherein the first reflector is substantially isolated from the environment.

2. The sensor of claim 1, wherein the first reflector comprises a first fiber Bragg grating.

3. The sensor of claim 1, wherein the first reflector and the long period grating are formed in the optical waveguide.

4. The sensor of claim 1, wherein the long period grating has a grating spacing of greater than 25 microns.

5. The sensor of claim 1, wherein the sensed parameter comprises pressure or strain.

6. The sensor of claim 1, wherein the first reflected light comprises a first wavelength.

7. The sensor of claim 6, wherein the insertion loss comprises a profile, and wherein the first wavelength corresponds to a sloped edge of the profile.

8. The sensor of claim 1, further comprising a second reflector coupled to the second end of the long period grating, wherein a second light is reflected from the second reflector.

9. The sensor of claim 8, wherein the first and second reflectors respectively comprise first and second fiber Bragg gratings.

10. The sensor of claim 8, wherein the first reflector, the second reflector, and the long period grating are formed in the optical waveguide.

11. The sensor of claim 8, wherein the first and second lights respectively comprises light at first and second wavelengths.

12. The sensor of claim 11, wherein the insertion loss comprises a profile, and wherein the first wavelength corresponds to a sloped edge of the profile.

13. A sensor for sensing a parameter in an environment, comprising:
   a long period grating formed in an optical waveguide, wherein a second end of the long period grating is coupleable to an optical source and an optical detector; and
   a first fiber Bragg grating coupled to a first end of the long period grating for reflecting a first light at a first wavelength through the long period grating to the second end, wherein the first fiber Bragg grating is substantially isolated from the environment, wherein the long period grating attenuates the intensity of the first reflected light in a manner indicative of the sensed parameter.

14. The sensor of claim 13, wherein the long period grating imparts an attenuation profile, and wherein the first wavelength corresponds to a sloped edge of the profile.

15. The sensor of claim 13, wherein the first fiber Bragg grating and the long period grating are formed in the optical waveguide.

16. The sensor of claim 13, wherein the long period grating has a grating spacing of greater than 25 microns.

17. The sensor of claim 13, wherein the sensed parameter comprises pressure or strain.

18. The sensor of claim 13, further comprising a second fiber Bragg grating coupled to the second end of the long period grating for reflecting a second light at a second wavelength.

19. The sensor of claim 18, wherein the first fiber Bragg grating, the second fiber Bragg grating, and the long period grating are formed in the optical waveguide.

20. The sensor of claim 18, wherein the long period grating imparts an attenuation profile, and wherein the first wavelength corresponds to a sloped edge of the profile.

21. A sensor system for sensing a parameter in an environment, comprising:
   an optical source for launching interrogating light and an optical detector for receiving reflected light;
   a long period grating formed in an optical waveguide and deployed in the environment, wherein a second end of the long period grating is coupled to the optical source and the optical detector; and
   a first reflector coupled to a first end of the long period grating for reflecting a first light to the optical detector, wherein the first reflector is not located in the environment, wherein the long period grating attenuates the intensity of the first light in a manner indicative of the sensed parameter.

22. The system of claim 21, wherein the first reflector comprises a first fiber Bragg grating.

23. The system of claim 21, wherein the first reflector and the long period grating are formed in the optical waveguide.

24. The system of claim 21, wherein the long period grating has a grating spacing of greater than 25 microns.

25. The system of claim 21, wherein the interrogating light comprises continuous wave light.

26. The system of claim 21, wherein the interrogating light comprises pulsed light.

27. The system of claim 21, wherein the environment comprises an oil/gas well.

28. The system of claim 21, wherein the sensed parameter comprises pressure or strain.

29. The system of claim 21, wherein the first light comprises a first wavelength.

30. The system of claim 29, wherein long period grating imparts an attenuation profile, and wherein the first wavelength corresponds to a sloped edge of the profile.

31. The system of claim 21, further comprising a second reflector, wherein the second reflector is coupled between the second end of the long period grating and the optical source and the optical detector, and wherein the second reflector reflects a second light to the optical detector.

32. The system of claim 31, wherein the first and second reflectors respectively comprise first and second fiber Bragg gratings.

33. The system of claim 31, wherein the first reflector, the second reflector, and the long period grating are formed in the optical waveguide.

34. The system of claim 31, wherein neither the first nor second reflectors are located in the environment.

35. The system of claim 31, wherein the first light and the second light respectively comprise light at first and second wavelengths.

36. The system of claim 35, wherein long period grating imparts an attenuation profile, and wherein the first wavelength corresponds to a sloped edge of the profile.

37. The system of claim 31, wherein the sensed parameter is indicated by dividing the first light by the second light.

38. The system of claim 37, wherein the sensed parameter, the first light, and the second light continually vary with time.

39. A method for sensing a parameter in an environment, comprising:
  positioning a long period grating in the environment;
  coupling a second end of the long period grating to an optical source and an optical detector, and coupling a first end of the long period grating to a first reflector, wherein the first reflector is substantially isolated from the environment;
  sending interrogating light from the optical source through the long period grating, wherein the light reflects from the first reflector to form first reflected light;
  detecting the first reflected light at the optical detector; and
  sensing the parameter by assessing at least the intensity of the first reflected light.

40. The method of claim 39, wherein the first reflector comprises a first fiber Bragg grating.

41. The method of claim 39, wherein the first reflector and the long period grating are formed in an optical waveguide.

42. The method of claim 39, wherein the long period grating has a grating spacing of greater than 25 microns.

43. The method of claim 39, wherein the interrogating light comprises continuous wave light.

44. The method of claim 39, wherein the interrogating light comprises pulsed light.

45. The method of claim 39, wherein the environment comprises an oil/gas well.

46. The method of claim 39, wherein the sensed parameter comprises pressure or strain.

47. The method of claim 39, wherein the first reflected light comprises a first wavelength.

48. The method of claim 47, further comprising attenuating the first reflected light as it passes through the long period grating.

49. The method of claim 39, further comprising detecting a second reflected light at the optical detector from a second reflector, wherein the second reflector is coupled between the second end of the long period grating and the optical source and the optical detector.

50. The method of claim 49, wherein the first and second reflectors respectively comprise first and second fiber Bragg gratings.

51. The method of claim 49, wherein the first reflector, the second reflector, and the long period grating are formed in an optical waveguide.

52. The method of claim 49, wherein the first and second reflected lights respectively comprise light at first and second wavelengths.

53. The method of claim 49, further comprising attenuating the first reflected light as it passes through the long period grating.

54. The method of claim 49, wherein the sensed parameter is assessed by dividing the intensity of the first reflected light from the intensity of the second reflected light.

55. The method of claim 54, wherein the sensed parameter, the first light, and the second light continually vary with time.

56. The method of claim 49, wherein neither the first nor second reflectors are located in the environment.

57. A method for sensing a parameter in an environment, comprising:
  positioning an optical sensor in the environment, wherein the optical sensor attenuates light in accordance with the parameter being sensed;
  coupling a second end of the optical sensor to an optical source and an optical detector, and coupling a first end of the optical sensor to a first reflector, wherein the first reflector is not located in the environment;
  sending interrogating light from the optical source through the optical sensor, wherein the light reflects from the first reflector to form first reflected light;
  detecting the first reflected light at the optical detector; and
  sensing the parameter by assessing at least the intensity of the first reflected light.

58. The method of claim 57, wherein the first reflector comprises a first fiber Bragg grating.

59. The method of claim 57, wherein the first reflector and the optical sensor are formed in an optical waveguide.

60. The method of claim 57, wherein the optical sensor has a grating spacing of greater than 25 microns.

61. The method of claim 57, wherein the interrogating light comprises continuous wave light.

62. The method of claim 57, wherein the interrogating light comprises pulsed light.

63. The method of claim 57, wherein the environment comprises an oil/gas well.

64. The method of claim 57, wherein the sensed parameter comprises pressure or strain.

65. The method of claim 57, wherein the first reflected light comprises a first wavelength.

66. The method of claim 65, further comprising attenuating the first reflected light as it passes through the optical sensor.

67. The method of claim 57, further comprising detecting a second reflected light at the optical detector from a second reflector, wherein the second reflector is coupled between the second end of the optical sensor and the optical source and the optical detector.

68. The method of claim 67, wherein the first and second reflectors respectively comprise first and second fiber Bragg gratings.

69. The method of claim 67, wherein the first reflector, the second reflector, and the optical sensor are formed in an optical waveguide.

70. The method of claim 67, wherein the first and second reflected lights respectively comprise light at first and second wavelengths.

71. The method of claim 70, further comprising attenuating the first reflected light as it passes through the optical sensor.

72. The method of claim 67, wherein the sensed parameter is assessed by dividing the intensity of the first reflected light from the intensity of the second reflected light.

73. The method of claim 72, wherein the sensed parameter, the first light, and the second light continually vary with time.

74. The method of claim 67, wherein neither the first nor second reflectors are located in the environment.

* * * * *